Figure 1:
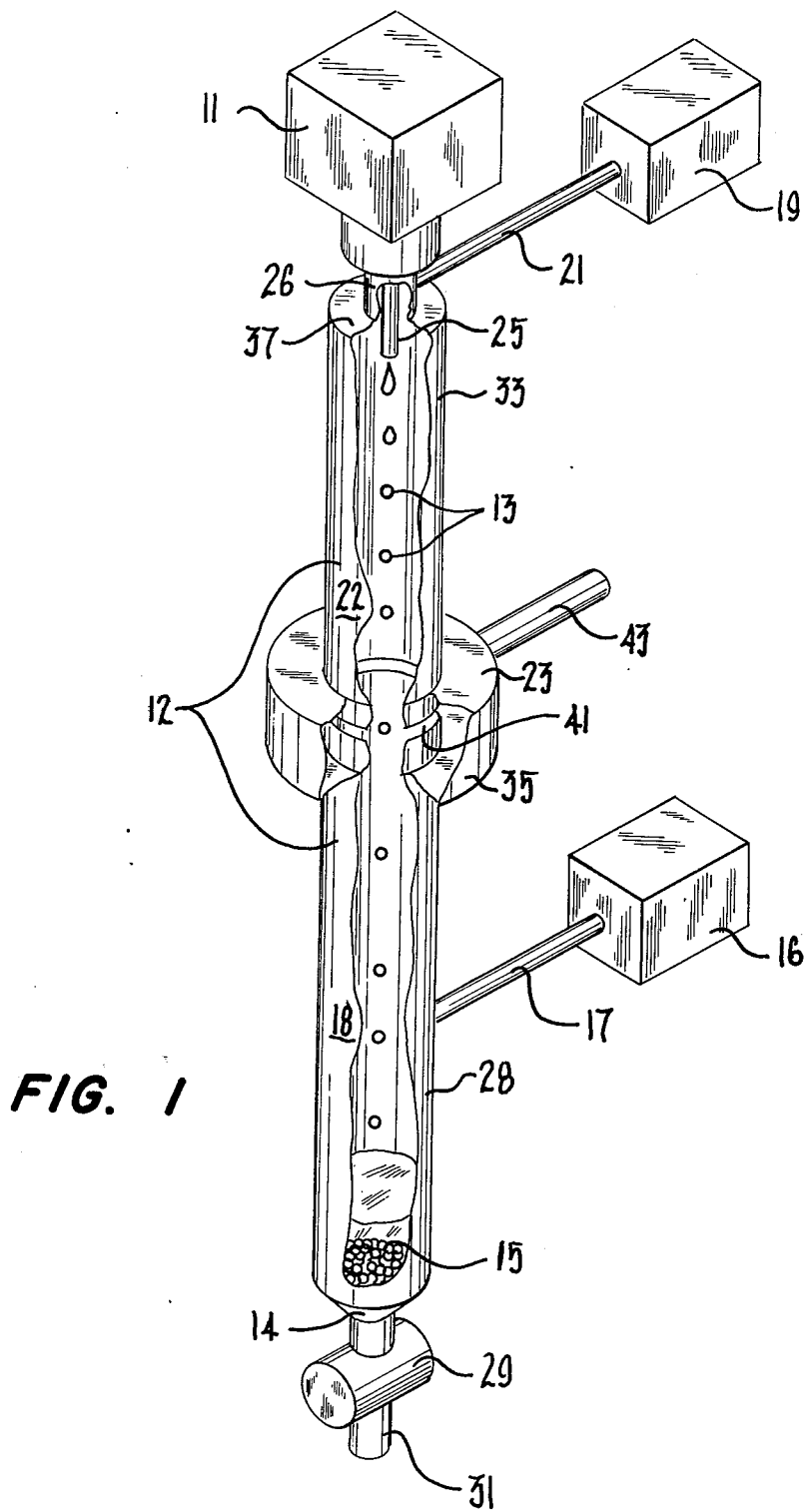

United States Patent [19]
Egli et al.

[11] 3,957,933
[45] May 18, 1976

[54] APPARATUS FOR PRODUCING MICROSPHERICAL PARTICLES AND METHOD FOR OPERATING SUCH APPARATUS

[75] Inventors: Walter Egli; William H. Bailey, Jr; David F., Leary, all of San Diego; Richard J. Lansley, Del Mar, all of Calif.

[73] Assignee: General Atomic Company, San Diego, Calif.

[22] Filed: Mar. 5, 1975

[21] Appl. No.: 555,694

[52] U.S. Cl. .................. 264/14; 65/21; 425/10
[51] Int. Cl.² ...................................... B29B 1/03
[58] Field of Search ............. 425/6, 7, 10; 264/5, 264/6, 11, 12, 13, 14, 15; 65/21

[56] References Cited
UNITED STATES PATENTS

| | | |
|---|---|---|
| 3,266,085 | 8/1966 | Nacke .......................... 425/10 X |
| 3,436,790 | 4/1969 | Simnad et al. ................. 425/10 |
| 3,811,850 | 5/1974 | Dobo ............................ 164/82 X |
| 3,856,441 | 12/1974 | Suzukawa et al. ............ 264/12 X |

Primary Examiner—Robert B. Reeves
Assistant Examiner—Joseph J. Rolla
Attorney, Agent, or Firm—Fitch, Even, Tabin & Luedeka

[57] ABSTRACT

Apparatus is described for producing microspherical particles. Also described is a method for operating said apparatus. A droplet generator dispenses uniform spherical droplets into a gelling column which is sealed at both ends to prevent entry of air thereinto. A gelling liquid and a gelling gas are provided in the column, and a further gas, which is of a density lower than that of the gelling gas, is introduced to the region above the gelling gas. At the interface between the gelling gas and the further gas, the gases are withdrawn from the gelling column.

7 Claims, 2 Drawing Figures

APPARATUS FOR PRODUCING MICROSPHERICAL PARTICLES AND METHOD FOR OPERATING SUCH APPARATUS

This invention relates generally to apparatus for producing microspherical particles and to a method for operating such apparatus. More particularly, the invention relates to such apparatus and method which are particularly useful in connection with the so-called solgel process for the production of nuclear fuel kernels.

The production of microspherical particles is important in various technical and industrial applications. Examples of these are in the preparation of nuclear fuel for high temperature gas-cooled reactors and in the preparation of particulate catalyst materials used in petroleum refining and other chemical processes. In most cases it is preferable, and in some cases it is essential, that such microspheres be produced with a preselected uniform size and be of uniform spherical shape.

Microspherical particles are conventionally manufactured by dispersing a suitable liquid feed stock, containing dissolved or suspended material, into small droplets and subsequently solidifying the droplets in a suitable manner, such as by chemically gelling the droplets and/or evaporating or otherwise removing the solvent or liquid carrier from the droplets.

A particular process which has been highly successful in connection with the preparation of microspheres of fertile or fissile material is known as the so-called "sol-gel" process. In this process, an aqueous sol liquid feed stock is dispersed into small droplets to fall downwardly into a gelling column. In the gelling column, a gelling gas is provided which causes gelling on the surface of the droplets. The gelling provides sufficient strength and elasticity to allow the spherical droplets to impact on a liquid surface without suffering permanent deformation. A liquid is provided at the lower end of the gelling column and the spherical droplets enter the liquid and are decelerated thereby. The liquid is of a composition which causes further gelling of the droplets into spherical particles which are then transferred to a further processing step. In the further processing step, the spherical gelled particles are dehydrated or otherwise treated under controlled conditions and are then sintered to a high density. The particles may be subsequently coated with a refractory material such as pyrolytic carbon.

In the foregoing described process, some problems have been encountered in connection with prior art apparatus and methods. In particular, insufficient surface gelling frequently occurs, resulting in impact damage and nonrounded particles. The cause of this is believed to be a dilution of the gelling gas with more dense air entering the gas-air interface. Gelling columns which are very long, for example several meters in length, may be used to increase the residence time of the particles in the gelling gas. This solution to the problem, however, typically requires costly elevated work platforms and support structures for the extensive gelling column length. In addition, a high flow of gelling gas may be utilized to further enhance the gelling process. This, however, may result in cost and pollution control penalties. Finally, the necessity to provide sufficient time and/or gelling gas flow to provide a satisfactory gelling may produce a limitation on the rate at which droplets may be processed.

It is an object of this invention to provide improved apparatus for producing microspherical particles, and an improved method for operating same.

Another object of the invention is to provide apparatus and a method for producing microspherical particles at a higher rate than possible with prior art apparatus and methods.

A further object of the invention is to provide microspherical particle producing apparatus and method in which impact damage as a result of insufficient surface gelling is minimized.

Figure 2:
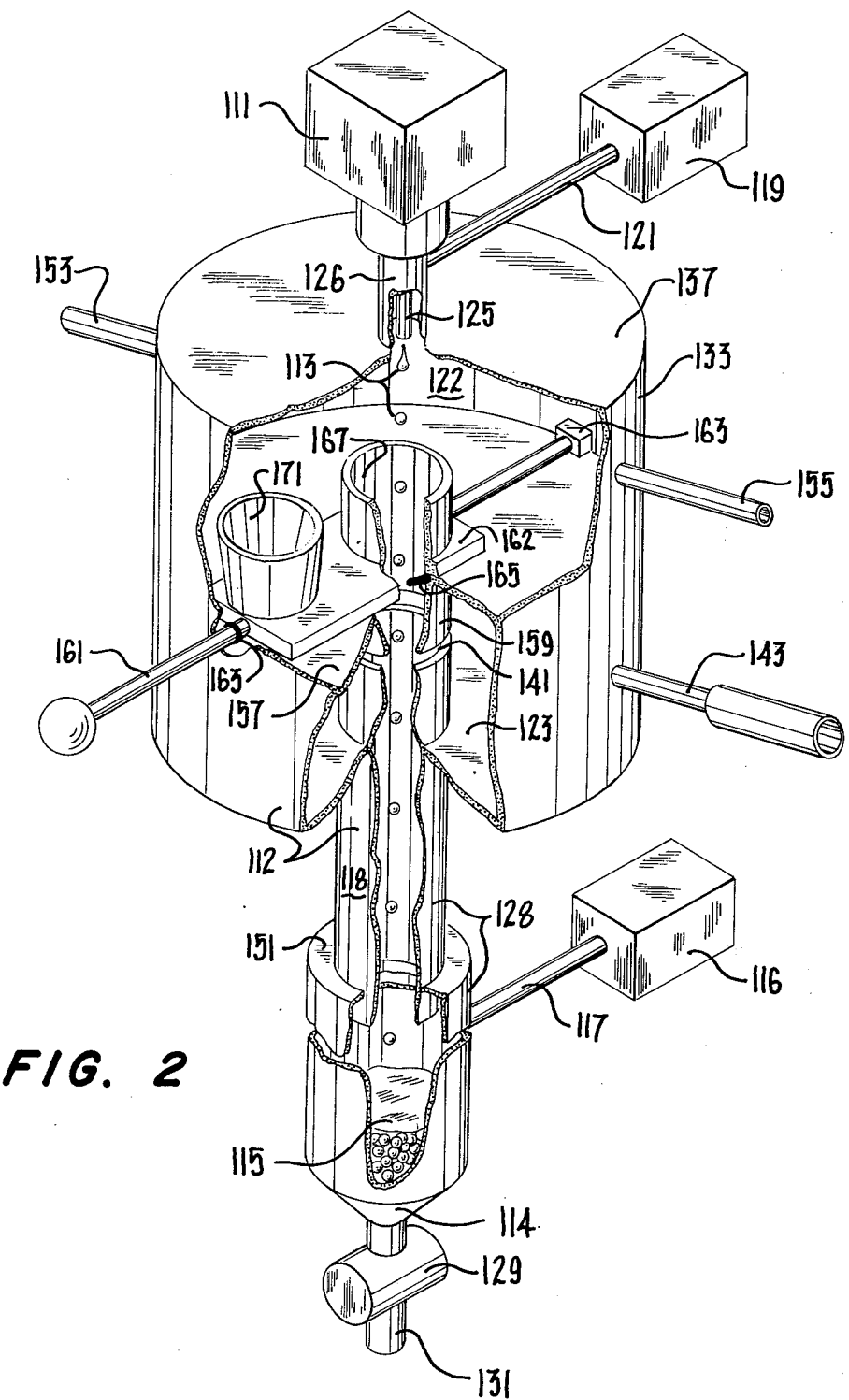

Various other objects of the invention will become apparent to those skilled in the art from the following description, taken in connection with the accompanying drawings wherein:

FIG. 1 is a partially sectioned perspective view of apparatus constructed in accordance with the invention; and FIG. 2 is a partially sectioned perspective view illustrating a further embodiment of the invention.

Very generally, the apparatus of the invention comprises a droplet generator 11 for dispersing uniform spherical droplets of a chemically gellable substance. A gelling column 12 is positioned for receiving droplets 13 from the droplet generator. The gelling column is sealed at both ends to prevent entry of air thereinto. Means 14 are provided at the lower end of the gelling column for confining a gelling liquid 15. A source 16 of a gelling gas is provided as well as means 17 for introducing the gelling gas from the source thereof to the region 18 within the gelling column and immediately above the gelling liquid. A source 19 of a further gas is provided, the further gas being of a density which is lower than that of the gelling gas. Means 21 introduce the further gas from the source thereof to the region 21 (the spheroidization region) within the gelling column and immediately above the gelling gas. Means 23 are provided for withdrawing gases from the gelling column at the interface between the region 18 of the gelling gas and the region 22 of the further gas.

The term "gas" as used herein and in the appended claims is intended to refer to a single gas or to a mixture of gases having the properties appropriate to the use described.

Referring now in greater detail to FIG. 1, the droplet generator 11 operates to disperse a liquid feed stock into uniform spherical droplets. The droplet generator 11 may be of any suitable type but preferably employs a capillary tube dispenser 25 which extends vertically downward and which ejects a series of droplets from the lower end of the tube in a direction axially of the tube. A coaxial passage 26 is also preferably provided surrounding the capillary 25. A flow of gas concurrent with the flow of droplets is supplied to the coaxial passage 26 through the passage 21 from the gas source 19. The concurrent flow of gas through the passage 26 enhances varicose instabilities in the jet stream in order to cause breakup of the jet into uniform spherical droplets. A droplet generator of the type described is shown and described in U.S. Pat. 3,731,850 issued May 8, 1973, and assigned to the assignee of the present invention.

The uniform spherical droplets 13 pass downwardly through the gelling column 12 and are collected in the gelling liquid 15 contained in the region at the frustoconical closed end 14 of the gelling column. The liquid 15 typically may be an ammonium hydroxide solution or an alcohol or the like which causes deceleration and sufficient gelling of the spherical particles 13 so as to enable further processing thereof. The settled gelled particles are removed from the gelling column through a suitable valve 29 and outlet passage 31 at the lower end of the gelling column. Alternatively, the lower end of the gelling column may remain open and be sealed by immersion beneath the free surface of the gelling liquid. An underliquid conveyor may be used to remove particles. A further alternative is to seal the lower end of the gelling column by a suitable liquid trap and remove the particles by pumping the liquid through a screen.

As the droplets 13 strike the surface of the liquid 15, certain physical stresses occur. To prevent permanent deformation of the droplets, a gelling gas is supplied to the region 18 within the gelling column which causes gelling on the surface of the droplets. The gelling is sufficient to provide the strength and elasticity which will allow the spheres to impact on the surface of the liquid 15 without suffering permanent deformation. The gelling gas may be of any suitable type, such as ammonia, and is supplied to the region 18 through the passage 17 from the gas source 16.

The upper portion 33 of the gelling column 12 is of slightly less diameter than the lower portion 28, and extends a slight distance coaxially within the lower portion 28. An annular wall 35 extends inwardly from the upper edge of the lower portion 28 of the gelling column 12 and is sealed against the outer surface of the upper portion 33 of the gelling column 12. The upper end of the upper portion 33 is closed against the lower end of the passage 26 by an annular wall 37. Thus, the entire gelling column 12 is sealed at both ends and is sealed throughout its length so as to prevent entry of air from the region surrounding the gelling column into its interior. Accordingly, entry of denser air into the gelling gas causing dilution of the gelling gas is prevented to maximize the surface gelling of the droplets which occurs in the region 18 of the gelling gas.

The gas entering spheroidization region 22 within the gelling column 12 from the gas source 19 is selected to have a density lower than that of the gelling gas. Thus, the gas entering from the source 19 to the region 22 may, for example, be helium. The presence of the lighter gas above the region 18, and the exclusion of air from the gelling column 12, prevents dilution of the gelling gas and consequently assures maximum gelling effect in the length of the gelling column devoted to gelling of the droplets.

In order to remove the gelling gas and the less dense gas in the upper region of the gelling column, the gelling column is provided with an annular orifice 41 at the interface between the regions 18 and 22. The annular orifice need not be continuous, as shown, but may also be comprised of a series of openings arranged to be the substantial equivalent of a continuous opening. In the illustrated example, the gelling gas is removed from the region 18 and the lighter or less dense gas in the region 22 is also removed through the annular passage 41. Collection is accomplished by means of an annular plenum 23 formed surrounding the annular orifice 41. A discharge passage 43 is provided in the plenum 23 and such passage is coupled to a suitable exhaust system in order to withdraw the gases from the plenum 23.

In operating the apparatus of the invention in accordance with the method of the invention, the droplet generator operates to discharge droplets from the capillary 25 downwardly into the region 22 within the upper portion 33 of the gelling column 12. The less dense gas, such as helium, is discharged into the region 22 through the coaxial passage 26 from the source 19. At the same time, the gelling gas is introduced to the region 18 from the source 16. Both gases are withdrawn through the annular passage 41 into the plenum 23 and from thence through the passage 43 to the unillustrated exhaust system. As the droplets fall downwardly through the gelling column, they become spherical and then enter the region 18 where gelling at the surface of the droplets occurs. By the time the droplets enter the liquid 15, sufficient gelling has occurred to prevent permanent deformation of the droplets as they strike the surface of the liquid. The gelled particles are then removed through the passage 31 by the valve 29.

Referring now more particularly to FIG. 2, a further embodiment of the invention is shown. Elements of the embodiment of FIG. 2 which are similar in design and function to elements of the embodiment of FIG. 1 have been given identical reference numbers preceded by a 1. In the embodiment of FIG. 2, the lower portion 128 of the gelling column 112 is formed in two sections, the lower one of which is slightly larger in diameter than the upper one, the sections being joined by an annular horizontal wall 151. The upper portion 133 of the gelling column 112 is of substantially larger diameter than the two sections of the lower portion 128. Two additional ports 153 and 155 are provided for introducing a gas of a lighter density than the gelling gas to the region 122 in addition to the gas introduced thereinto through the coaxial passage 126. A plate 157 separates the interior of the upper portion 133 from the plenum 123. A hollow cylinder 159 projects downwardly from the plate 157 coaxially within the plenum 123 and is spaced from the upper end of the upper section of the lower portion 128 to form the annular passage 141.

A sliding gate valve 161 is provided for isolating the region 122 from the region 118. The gate valve 161 includes a plate 162 sealed by seals 163 at the walls of the upper portion 133 of the gelling column 122. An annular seal 165 is provided at the upper end of the hollow cylinder 159. A hollow cylinder 167 forms an opening in the gate valve plate 161 and is of the same diameter as the hollow cylinder 159. When the cylinders 167 and 159 are in alignment, the apparatus is in an operative condition and the droplets fall from the capillary 125 axially down through the aligned cylinders 167 and 159.

A removable container 171 is provided on the plate 162 set in a recess therein in the upper surface thereof. When the gate valve is moved to the closed condition, the container 171 is aligned axially with the capillary 125 and therefore catches any droplets falling therefrom. Suitable doors, not illustrated, are provided in the upper portion 133 for removing the removable container 171 therein and for facilitating cleanup and maintenance.

Operation of the apparatus of FIG. 2 is substantially the same as that described in connection with the operation of the apparatus of FIG. 1. In both of the embodiments of FIGS. 1 and 2, operation of the gelling gas and the lighter gas is preferably at a slightly positive pressure relative to the atmospheric pressure immediately surrounding the column. This precludes inleakage of air to insure that dilution of the gelling gas will not occur.

The illustrated apparatus has been operated in accordance with the invention with virtually total elimination of non-round spheres. The consumption of gelling gas is also reduced significantly over prior art structures. A stable, well-defined interface is provided between the gelling gas and the lighter gas above the gelling region and inleakage of air is virtually eliminated.

It may be seen, therefore, that the invention provides an improved apparatus for producing microspherical particles. In addition, the invention provides an improved method for operating microspherical particle producing apparatus of the type which employs a droplet generator and a vertical gelling column.

Various modifications of the invention in addition to those shown and described herein will become apparent to those skilled in the art from the foregoing description and accompanying drawings. Such modifications are intended to fall within the scope of the appended claims.

What is claimed is:

1. Apparatus for producing microspherical particles, comprising, a droplet generator for dispensing uniform spherical droplets of a chemically gellable substance, a gelling column positioned for receiving droplets from said droplet generator, said gelling column being sealed at both ends to prevent entry of air thereinto, means at the lower end of said gelling column for confining a gelling liquid, a source of gelling gas, means for introducing the gelling gas from said source thereof to the region within said gelling column and immediately above the gelling liquid, a source of a further gas of a density lower than that of the gelling gas, means for introducing the further gas from said source thereof to the region within said gelling column and immediately above the gelling gas, and means for withdrawing gases from said gelling column at the interface between said region of the gelling gas and said region of the further gas.

2. Apparatus according to claim 1 wherein said withdrawing means comprise an annular plenum surrounding said gelling column at said interface, said column having at least one opening therein communicating with said plenum.

3. Apparatus according to claim 1 wherein said droplet generator includes a capillary dispensary, and wherein said further gas introducing means include a coaxial passage at said capillary dispenser and further passages communicating with said gelling column above said interfce.

4. Apparatus according to claim 1 including a gate valve positioned proximate said interface for isolating the further gas from the gelling gas.

5. Apparatus according to claim 4 including a removable container positioned on said gate valve for receiving droplets when said gate valve is closed.

6. A method for operating microspherical particle producing apparatus having a droplet generator and a vertical gelling column, comprising, providing a gelling liquid at the lower end of the gelling column, introducing a gelling gas to the gelling column in the region immediately above the gelling liquid, introducing a further gas of a density lower than that of said gelling gas to the region within the gelling column and immediately above the gelling gas, and withdrawing the gelling gas and further gas from the gelling column at the interface between the region of the gelling gas and the region of the further gas.

7. A method according to claim 6 wherein the introduced gases are maintained in the gelling column at pressures in excess of the ambient pressure outside the gelling column to preclude inleakage of air.

* * * * *